Feb. 13, 1940. S. A. SNELL 2,190,087
BRAKE MECHANISM
Filed Feb. 25, 1939
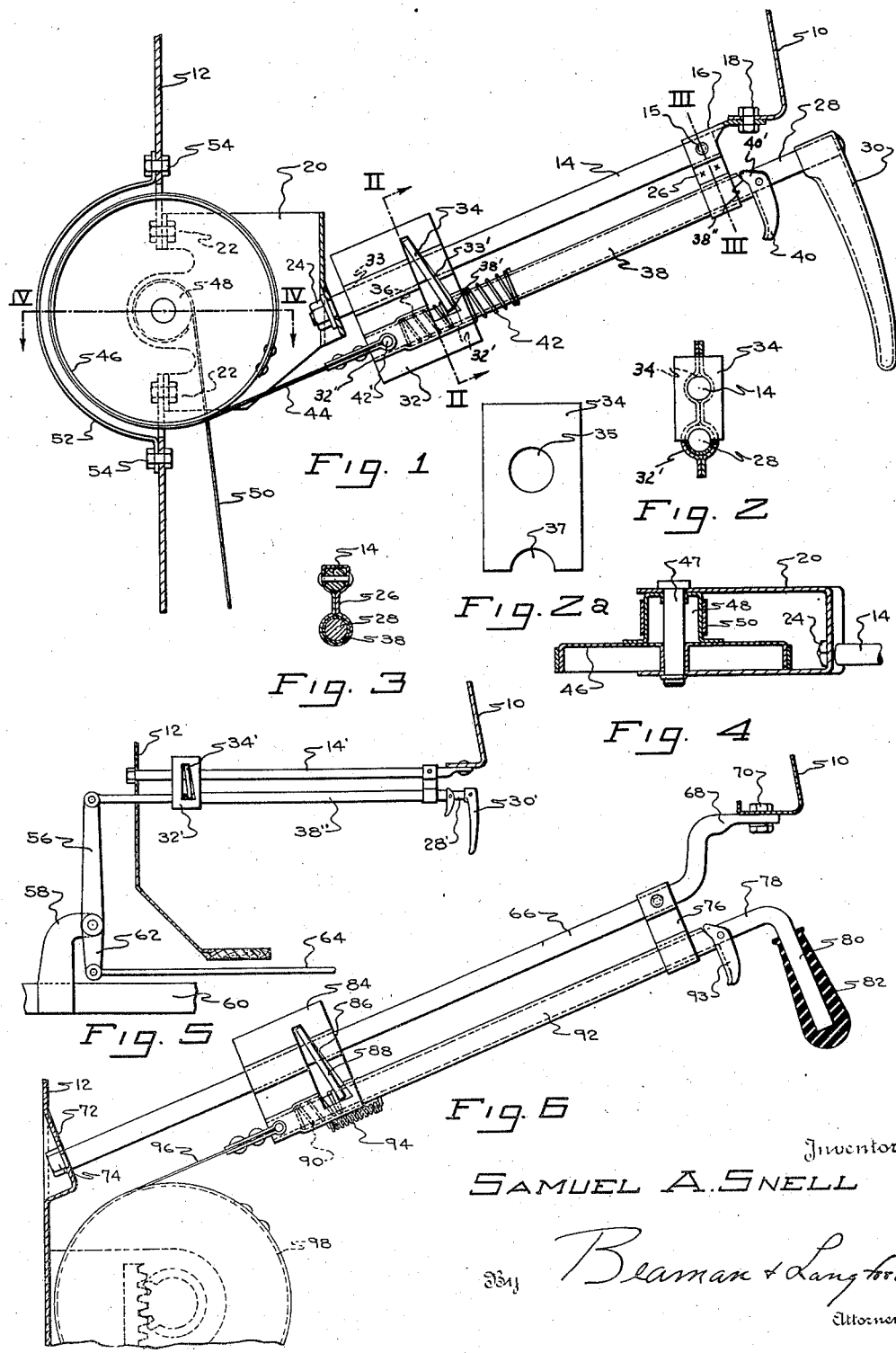
Inventor
SAMUEL A. SNELL
By Beaman & Langford
Attorneys

Patented Feb. 13, 1940

2,190,087

UNITED STATES PATENT OFFICE 2,190,087

BRAKE MECHANISM

Samuel A. Snell, Jackson, Mich., assignor to Townsend F. Beaman, Jackson, Mich.

Application February 25, 1939, Serial No. 258,378

6 Claims. (Cl. 74—531)

The present invention relates to manually actuated brake applying and other similar structure.

In my co-pending application Serial No. 253,985, filed February 1, 1939, I have disclosed certain novel clutch and locking means for holding a brake actuator in different brake applying positions. The present application is primarily concerned with further improvements in clutch means for axially movable force transmitting structure, being particularly adaptable to brake actuators of the pull-push type. I consider this to be a continuation of my aforesaid co-pending application.

As its primary object, the present invention provides novel clutch structure for an axially moved force transmitting member, such as a brake actuator, for releasably locking the same in any one of many positions of adjustment.

Another object resides in providing novel guiding, supporting and dogging mechanism for an axially reciprocated brake actuator or similar structure.

A further object is to provide a force transmitting mechanism in which a pair of parallel members, axially movable relative to each other have a clutch member movable with one member and engaging with the other for selectively locking the member in position of axial adjustment; there being releasing means associated with the clutch casing member for rendering the clutch inoperative in all positions of axial adjustment of the parallel members.

A still further object resides in providing a manually operated brake actuator for vehicles in which a fixed supporting and guiding bar extends between the instrument panel and the dash upon which a hanger slides carrying a clutch member; the hanger being connected to an axially movable brake actuator bar disposed in parallelism with the fixed bar with releasing means upon the movable bar and operating upon the clutch.

These and other objects and advantages residing in the arrangement, construction and combination of parts of the illustrated embodiments of the invention will more fully appear from the following description and annexed claims.

In the drawing,

Fig. 1 is a side elevational view of the present invention shown adapted to a vehicle, Fig. 2 is a cross-sectional view taken on line II—II of Fig. 1 through the hanger showing the clutch detent in position, Fig. 2a is a plan view of the detent, Fig. 3 is a cross-sectional view taken on line III—III of Fig. 1 through the guiding and supporting bracket for the brake actuator bar, Fig. 4 is a cross-sectional view of the power transmitting unit taken on line IV—IV of Fig. 1, Fig. 5 is a schematic view of the principle of the present invention applied to another form of brake applying mechanism, and Fig. 6 is a view similar to Fig. 1 of a slightly modified form of the invention.

The construction, in its preferred form, for carrying out the above stated objects of the present invention comprising a fixed bar which in the case of a brake actuator for a vehicle may be supported between the instrument panel 10 and dash 12 in the manner of the bar 14 as shown in Fig. 1. The bar 14 which for inexpensive fabrication may be of round rod or wire stock is pinned at 15 into an attachment hanger 16 bolted or otherwise secured at 18 to the panel 10. A bracket 20 bolted at 22 to the dash 12 offers support to the opposite end of the bar 14 which is threadedly held by the nut 24. The hanger 16 has guide portions 26 through which the bar 28 extends having a hand grip 30 at one end and a hanger 32 at the opposite end which is apertured at 33 to slidably receive the bar 14. The bar 28 may be of round bar stock similar to the bar 14. The hanger 32 has a recess 32' of larger diameter than the bar 28, which extends part way through the length of the hanger 32 and a bore portion 32" in which the end of the bar 28 is closely fixed. A transverse slot 33' in the hanger 32 having a vertical side and a downward flared side accommodates a friction clutch detent 34 which receives the bar 14 in its aperture 35 of slightly larger diameter. The lower end of the detent 34 is bifurcated at 37 to clear the rod 28. A spring 36 embracing the rod 28 within the recess 32' acts against the bifurcated end of the detent 37 to fulcrum the detent 34 about its upper end confined in the narrow portion of the slot 33' to bite the rod 14 in a well known manner. With the detent 34 rocked by the spring 36 into the position shown in Fig. 1, movement of the rod 28 to the left is prevented. However, an outward pull on the hand grip 30 will slide the hanger 32 to the right along the bar 14 as the vertical side of the slot 33' prevents the detent from biting the bar 14 upon such movement. To release the bar 28 for axial movement to the left from all positions of adjustment of the hanger 32 along the bar 14, a release bar 38, shown as a tube slidable upon the bar 28, actuated by a trigger 40, is provided. The end 38' of the bar 38 is received in the recess 32' to act upon the bifurcated end of the detent 34 rocking the same into a vertical plane when the trigger 40 is rocked about its pivotal axis bringing the nose 40' into camming engagement with the inclined surface 38". A spring 42 embracing the bar 38 acting between the hanger 32 and projection 43 urges the bar 38 to the inoperative position shown in Fig. 1.

Movement of the bar 28 is shown being transmitted to a mechanical motion reducing unit, of the type more fully described in my aforesaid co-pending application, through a flexible band 44 pinned at 42' to the bar 28 and passing about a large drum 46 supported for rotation upon an axle 47. A smaller drum 48 unitary with the drum 46 transmits movement through the flexible cable 50 to the brakes of the vehicle through suitable connectors (not shown).

The operation of the above described mechanism should be readily understood: With the brakes released the bar 28 is in its innermost position. To apply the brake, the operator grips the hand grip 30 and draws the bar 28 outwardly. As the end of the bar 28 is anchored to the hanger 32, the latter slides along the bar 14. With the clutch detent 34 cocked as shown in Fig. 1, the bar 28 will stay in any position to which it is outwardly pulled. As the releasing bar 38 moves with the bar 28 as a unit in all positions of adjustment manipulation of the trigger 40 tilts the detent 34 so that it will freely slide upon the bar 14. The operator is then able to push the bar 28 inwardly to release the brakes. It is of considerable advantage to be able to release the detent without the necessity of first removing the load therefrom as is necessary in conventional pawl and rack locking mechanism heretofore used upon emergency brake levers. The detent 34 also has the desirable characteristic of being substantially silent in its operation. It will be observed that the bar 14 serves as a brace or tie-rod between the dash and instrument board in addition to supporting and guiding the brake actuator 28.

In the modification of Fig. 5 the primed reference characters indicate corresponding parts identified by corresponding unprimed reference characters in Fig. 1. The bar 38" is shown extended through the dash 12 and connected to an upright lever 56 pivoted from the bracket 58 upon the frame 60. That portion 62 of the lever 56 extending below the pivot is connected to a rod 64 extending to the brake mechanism. A suitable pin and slot connection between the lever 56 and bar 38' takes care of the arcuate movement and avoids binding or reflection of the bar 28'.

The modification of Fig. 6 is characterized by its simplicity and inexpensive construction. The bar 66 is preferably of round bar or wire stock cold forged or otherwise shaped at 68 to enable one end to be directly bolted at 70 to the panel 10. The opposite end of the bar 66 is reduced and threaded for securing the same through the nut 74 to the dash 12. A bracket 76 supported from the bar 66, gives slidable support to the bar 78 which is of round rod or wire stock. As shown the bar 78 has been shaped at its outer end into a handle portion 80 having a molded rubber grip thereon. The hanger 84 supports and guides the opposite end of the bar 78 in the manner described with reference to the construction of Fig. 1; the hanger 84 being slotted at 86 to receive the clutch detent 88 which is rocked by the spring 90 into biting relation with the bar 66. The release bar 92 is actuated through the trigger 93 to dispose the detent 88 in a plane normal to the axis of the bar 66 compressing the spring 94 which normally urges the bar 92 into an inoperative position. The construction just disclosed may be substantially identical to that described in Fig. 1 for locking and releasing the brake actuator 28. A flexible cable 96 pinned to the hanger 84 passes around the grooved pulley 98 for producing rotary motion in the manner more fully described in my co-pending application aforesaid.

Having thus described my invention, what I desire to protect by Letters Patent and claim is:

1. In a vehicle, the combination with a dash and instrument panel in spaced relation, of a bracing bar connected at opposite ends to said dash and panel, a brake actuator bar disposed in parallelism with said bracing bar, means supporting said actuator bar from said bracing bar for lengthwise movement, a clutch member interposed between said bars and movable with said actuator bar along said bracing bar, and means upon said actuator bar for releasing said clutch.

2. The combination as defined in claim 1 wherein said clutch is in the form of a friction detent embracing said bracing bar.

3. In a brake operating device, a pair of bar members in spaced parallel relation, one of said bars being fixed and the other axially movable, means for supporting said movable bar from said fixed bar for axial movement, a clutch interposed between said bars, means upon said axially movable bar for imparting unitary movement to said clutch along said fixed bar, said clutch engaging said fixed bar to resist relative axial movement of said bars in a brake releasing direction.

4. In a brake operating device, a hand operated member for applying and releasing the brake, means for supporting said member for axial movement including a fixed member spaced from and in parallelism with said first member, a one way clutch interposed between said members, means upon said movable member for supporting said clutch for unitary movement therewith along said fixed member, means causing said clutch to grip said fixed member to resist movement of said other member in a brake releasing movement while permitting axial movement in a brake applying direction, and releasing means upon said movable member acting upon said clutch to render the same inoperative permitting movement of said movable member in a brake releasing direction.

5. In a brake operating device, a hand operated member, means for supporting said member for lengthwise movement in opposite directions for applying and releasing the brake, a clutch means supported for unitary movement with said member, and a fixed member paralleling said first member with which said clutch engages to resist relative axial movement between said members in a brake releasing direction with said clutch member in one position of operation, and releasing means upon said first member and engageable with said clutch in all positions of engagement along said fixed member for moving said clutch into another position of operation permitting relative axial movement between said members in a brake releasing direction.

6. In a brake operating device or the like, a pair of members in spaced parallel relation, one of said members being fixed and the other of said members being supported for lengthwise movement, a one-way friction clutch carried by said movable member and freely slidable along said fixed member in a brake applying direction, said friction clutch having a tiltable clutching plate, means for causing said clutch to grip said fixed member in all positions of adjustment along said fixed member to resist movement in a brake releasing direction, releasing means upon said movable member engageable with said plate, and means for actuating said releasing means to tilt said plate to render said clutch inoperative to permit movement of said movable member in a brake releasing direction.

SAMUEL A. SNELL.